United States Patent
Ogawa

(10) Patent No.: US 10,924,680 B2
(45) Date of Patent: Feb. 16, 2021

(54) IMAGE CAPTURE CONTROL APPARATUS AND METHOD OF CONTROLLING THE SAME

(71) Applicant: CANON KABUSHIKI KAISHA, Tokyo (JP)

(72) Inventor: Seiji Ogawa, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 16/566,275

(22) Filed: Sep. 10, 2019

(65) Prior Publication Data

US 2020/0092494 A1  Mar. 19, 2020

(30) Foreign Application Priority Data

Sep. 14, 2018 (JP) ................................ 2018-172826

(51) Int. Cl.
*H04N 5/232* (2006.01)

(52) U.S. Cl.
CPC ... *H04N 5/232945* (2018.08); *H04N 5/23216* (2013.01); *H04N 5/232935* (2018.08)

(58) Field of Classification Search
CPC .............................................. H04N 5/232935
See application file for complete search history.

(56) References Cited

U.S. PATENT DOCUMENTS

| 9,066,005 | B2* | 6/2015 | Park | G03B 13/18 |
| 2012/0274815 | A1* | 11/2012 | Matsumoto | H04N 9/8042 |
| | | | | 348/240.99 |
| 2012/0327274 | A1* | 12/2012 | Taguchi | G03B 17/18 |
| | | | | 348/240.2 |
| 2015/0103223 | A1* | 4/2015 | Park | H04N 5/23222 |
| | | | | 348/333.12 |
| 2016/0295120 | A1* | 10/2016 | Ota | H04N 5/23293 |
| 2017/0064188 | A1* | 3/2017 | Yoshida | H04N 5/23212 |
| 2018/0184009 | A1* | 6/2018 | Yoshimi | H04N 5/232935 |
| 2019/0243533 | A1* | 8/2019 | Imamiya | G02B 7/09 |
| 2019/0313033 | A1* | 10/2019 | Ota | H04N 5/23216 |

FOREIGN PATENT DOCUMENTS

JP  2016-197819 A  11/2016

* cited by examiner

*Primary Examiner* — Cynthia Segura
(74) *Attorney, Agent, or Firm* — Cowan, Liebowitz & Latman, P.C.

(57) ABSTRACT

An image capture control apparatus that comprises an operation member configured to accept an MF operation that is an instructional operation for manual focus, and that switches a display magnification of a live view to one of a plurality of display magnifications including a first magnification and a second magnification that represents a greater enlargement than the first magnification, performs control to display a guide indicating a degree of focus at a focus detection position, and performs control to, when the live view is displayed at the second magnification, switch the live view to display at the first magnification and display the guide together with the live view at the first magnification if the MF operation is performed.

12 Claims, 7 Drawing Sheets

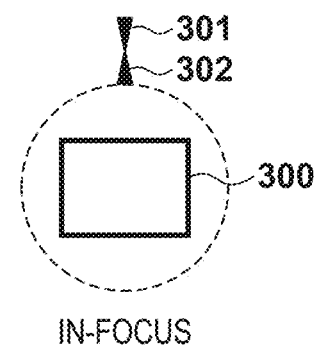
FIG. 3A  IN-FOCUS
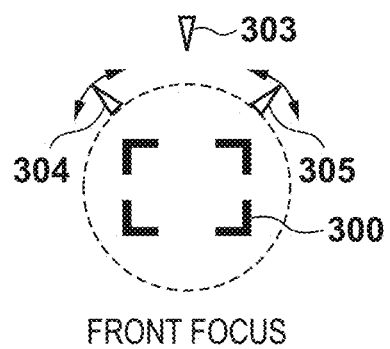
FIG. 3B  FRONT FOCUS
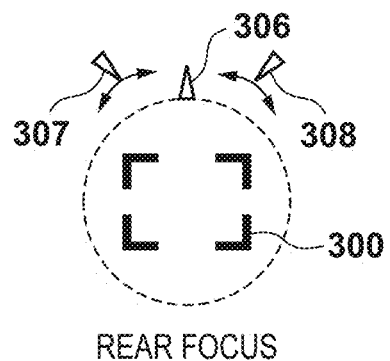
FIG. 3C  REAR FOCUS
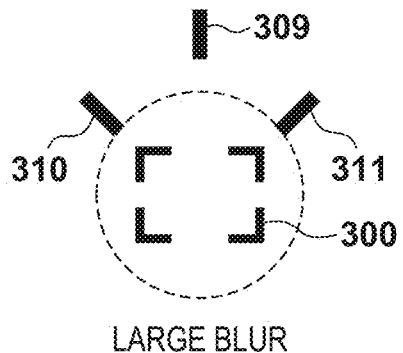
FIG. 3D  LARGE BLUR

IMAGE CAPTURE CONTROL APPARATUS AND METHOD OF CONTROLLING THE SAME

BACKGROUND OF THE INVENTION

Field of the Invention

The present invention relates to techniques to control display of a live view.

Description of the Related Art

Digital cameras have a known function of displaying a live view in an enlarged state, or displaying a degree of focus by displaying a focus detection position superimposed on the live view (hereinafter, a focus guide), as means for checking a degree of focus when making focus adjustment through a manual operation (see Japanese Patent Laid-Open No. 2016-197819).

Enlarged display of a live view is suitable for a case where focus adjustment is made while checking in detail a degree of focus in a portion included in an angle of view. On the other hand, a focus guide enables focus adjustment to be made while checking a degree of focus in a portion included in an angle of view using the guide, and also while checking a degree of focus in the entire angle of view (shooting range) on the live view. Therefore, in order to make focus adjustment while checking the entire shooting range, it is desirable to cancel the enlarged display of the live view. In contrast, according to Japanese Patent Laid-Open No. 2016-197819, the enlarged display is not cancelled unless a user explicitly performs an operation of changing an enlargement rate or an operation of cancelling the enlarged display during the enlarged display of the live view.

SUMMARY OF THE INVENTION

The present invention has been made in consideration of the aforementioned problems, and realizes image capture control techniques that can cancel enlarged display of a live view at a favorable timing that suits a condition of a user operation.

In order to solve the aforementioned problems, the present invention provides an image capture control apparatus comprising: an operation member configured to accept an MF operation that is an instructional operation for manual focus; and a memory and at least one processor and/or at least one circuit which function as a switching unit configured to switch a display magnification of a live view to one of a plurality of display magnifications including a first magnification and a second magnification that represents a greater enlargement than the first magnification, a display control unit configured to perform control to display a guide indicating a degree of focus at a focus detection position, and a control unit configured to perform control to, when the live view is displayed at the second magnification, switch the live view to display at the first magnification and display the guide together with the live view at the first magnification if the MF operation is performed.

In order to solve the aforementioned problems, the present invention provides a method of controlling an image capture control apparatus having an operation member configured to accept an MF operation that is an instructional operation for manual focus, the method comprising: switching a display magnification of a live view to one of a plurality of display magnifications including a first magnification and a second magnification that represents a greater enlargement than the first magnification; performing control to display a guide indicating a degree of focus at a focus detection position; and performing control to, when the live view is displayed at the second magnification, switch the live view to display at the first magnification and display the guide together with the live view at the first magnification if the MF operation is performed.

In order to solve the aforementioned problems, the present invention provides a non-transitory computer-readable storage medium storing a program that causes a computer to function as a switching unit, a display control unit and a control unit of an image capture control apparatus comprising an operation member configured to accept an MF operation that is an instructional operation for manual focus, wherein the switching unit is configured to switch a display magnification of a live view to one of a plurality of display magnifications including a first magnification and a second magnification that represents a greater enlargement than the first magnification, the display control unit is configured to perform control to display a guide indicating a degree of focus at a focus detection position, and the control unit is configured to perform control to, when the live view is displayed at the second magnification, switch the live view to display at the first magnification and display the guide together with the live view at the first magnification if the MF operation is performed.

According to the present invention, image capture control techniques that can cancel enlarged display of a live view at a favorable timing that suits a condition of a user operation are realized.

Further features of the present invention will become apparent from the following description of exemplary embodiments (with reference to the attached drawings).

BRIEF DESCRIPTION OF THE DRAWINGS

FIGS. 3A to 3D illustrate display appearances of focus guides.

DESCRIPTION OF THE EMBODIMENTS

Hereinafter, embodiments of the present invention will be described in detail with reference to the appended drawings.

<Apparatus Configuration>

The functions and external appearance of a digital camera as an image capture control apparatus according to the present embodiment will be described with reference to FIGS. 1 and 2.

Figure 1:
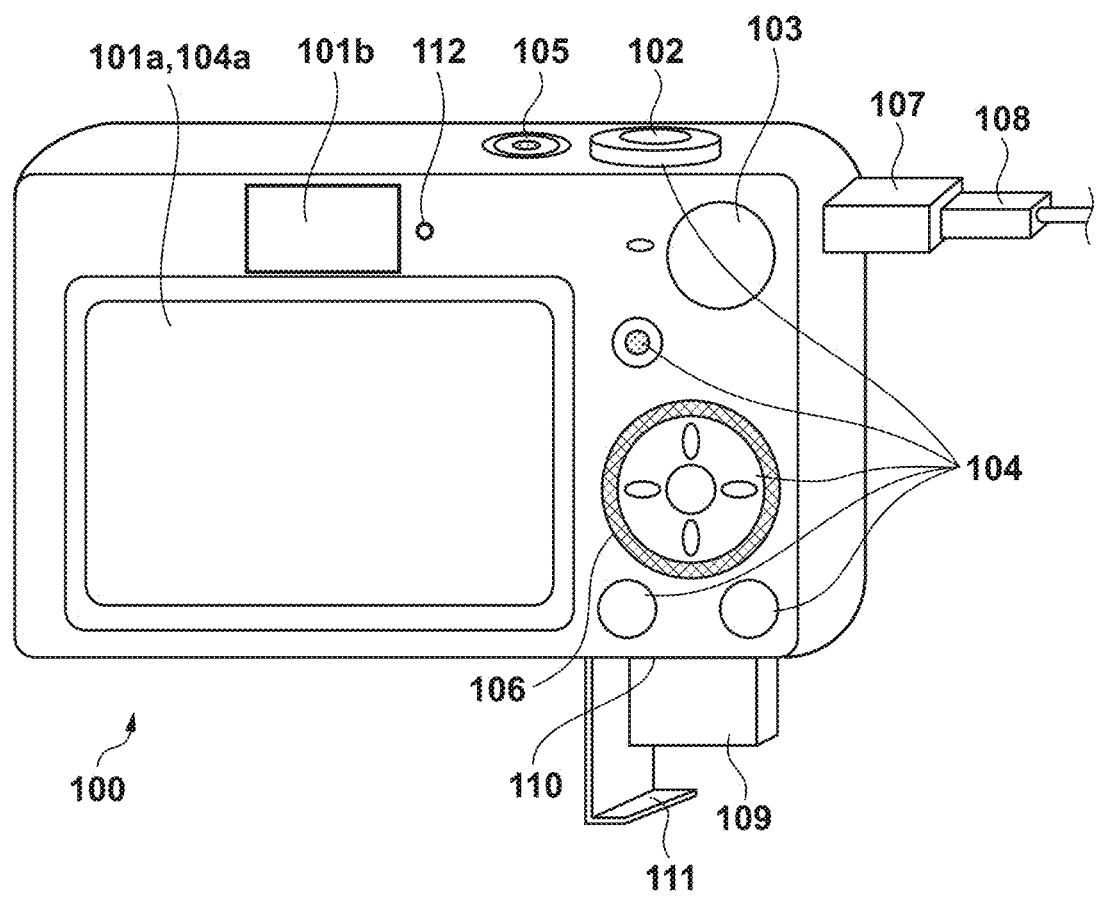
FIG. 1 is an exterior view of a rear of a digital camera.

In FIG. 1, which illustrates the external appearance of a rear of a digital camera 100 according to the present embodiment, a display unit 101 is constituted by a liquid crystal display panel (LCD) that displays images, various types of information, and the like. The display unit 101 includes a rear display panel 101a, which is a display unit arranged outside of a viewfinder, and an electronic viewfinder ("EVF" hereinafter) 101b, which is a display unit within the viewfinder. A shutter button 102 is an operation member for making a shooting instruction. A mode switching button 103 is an operation member for switching among various types of modes. A connector 107 is an interface for connecting a connection cable 108 to the digital camera 100. Operation units 104 are operation units constituted by operation members such as various types of switches and buttons and a touch panel which accept various types of operations from the user. A controller wheel 106 is an electronic dial, included in the operation units 104, that can be rotated. A power switch 105 is an operating member for switching the power on and off. A recording medium 109 is a recording medium such as a memory card, a hard disk, or the like. A recording medium slot 110 is a slot for holding the recording medium 109. The recording medium 109 stored in the recording medium slot 110 can communicate with the digital camera 100. A cover 111 is a cover for the recording medium slot 110. FIG. 1 illustrates a state in which the cover 111 is open, and the recording medium 109 has been partially removed and is exposed from the recording medium slot 110. An eye proximity detection unit 112 can detect that some sort of object has approached to the eyepiece part of the viewfinder that includes the EVF 101b using an infrared proximity sensor or the like.

Figure 2:
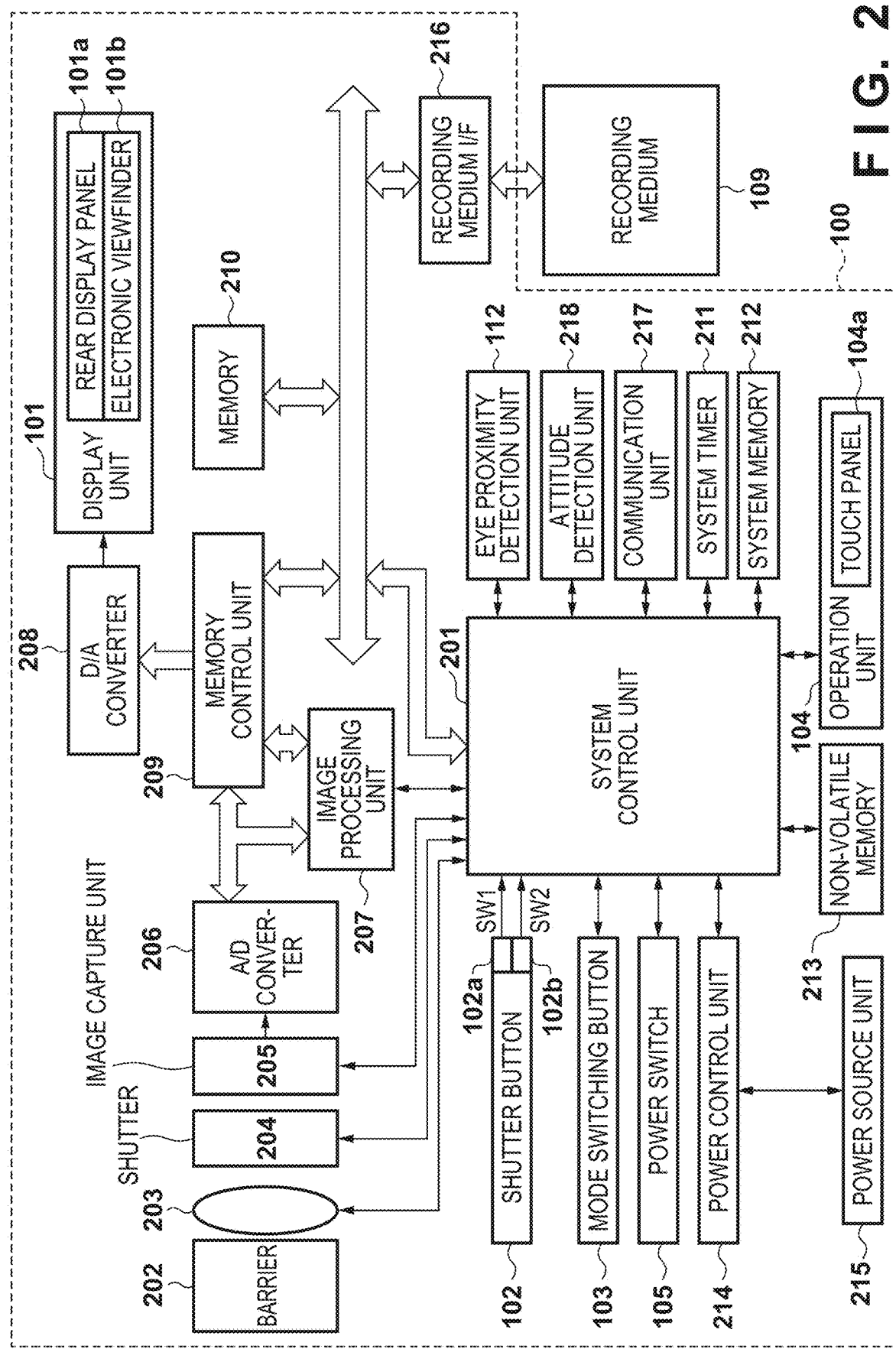
FIG. 2 is a block diagram illustrating the configuration of the digital camera.

In FIG. 2, which illustrates the internal configuration of the digital camera 100 according to the present embodiment, a photographing lens 203 is a lens group including a zoom lens and a focus lens. A shutter 204 has an aperture function. An image capture unit 205 is an image sensor constituted by a CCD, a CMOS, or the like that converts an optical image of an object into an electrical signal. An A/D converter 206 converts analog signals into digital signals. The A/D converter 206 is used to convert analog signals output from the image capture unit 205 into digital signals. A barrier 202 prevents an image capture system of the digital camera 100 including the photographing lens 203, the shutter 204, and the image capture unit 205 from being soiled or damaged by covering the image capture system including the photographing lens 203.

An image processing unit 207 carries out predetermined pixel interpolation, resizing processing such as reduction, color conversion processing, and the like on data from the A/D converter 206 or data from a memory control unit 209. The image processing unit 207 also performs predetermined computational processing using captured image data, and a system control unit 201 performs exposure control and range-finding control based on results obtained from these computations. A TTL (through-the-lens) AF (autofocus) process, an AE (automatic exposure) process, and an EF (flash pre-emission) process are performed as a result. The image processing unit 207 also performs predetermined computational processes using the captured image data, performing a TTL AWB (auto white balance) process on the basis of the obtained computation results.

Data output from the A/D converter 206 is written directly into memory 210 through the image processing unit 207 and the memory control unit 209, or through the memory control unit 209. The memory 210 stores the image data obtained by the image capture unit 205 and converted into digital data by the A/D converter 206, image data for display in the display unit 101, and the like. The memory 210 has a storage capacity sufficient to store a predetermined number of still images, a predetermined time's worth of moving images and audio, and so on.

The memory 210 also functions as image display memory (video memory). A D/A converter 208 converts data for image display, stored in the memory 210, into an analog signal and supplies the analog signal to the display unit 101. Image data for display written into the memory 210 thus displayed by the display unit 101 via the D/A converter 208 in this manner. The display unit 101 carries out a display in the display device, which is an LCD or the like, based on the analog signal from the D/A converter 208. A digital signal subjected to A/D conversion by the A/D converter 206 and stored in the memory 210 is converted to an analog signal by the D/A converter 208, and is then sequentially transferred to and displayed in the display unit 101, thereby performing a live view image display.

Non-volatile memory 213 is electrically erasable/recordable memory, and EEPROM is used, for example. Operational constants, programs, and so on of the system control unit 201 are stored in the non-volatile memory 213. Here, "programs" refers to programs for executing the various flowcharts according to the present embodiment, which will be described later.

The system control unit 201 controls the entire digital camera 100. The respective processes according to the present embodiment, which will be described later, are realized by executing programs stored in the non-volatile memory 213 described above. 212 indicates system memory, and RAM is used for the system memory. Operational constants and variables for the system control unit 201, programs read from the non-volatile memory 213, and so on are loaded into the system memory 212. The system control unit 201 also carries out display control by controlling the memory 210, the D/A converter 208, the display unit 101, and so on.

A system timer 211 is a time measurement unit that measures times used in various types of control, measures the time of an internal clock, and so on.

The mode switching button 103, a first shutter switch 102a, a second shutter switch 102b, and the operation units 104 are operation devices for inputting various types of operating instructions to the system control unit 201.

The mode switching button 103 switches an operating mode of the system control unit 201 among a still image shooting mode, a moving image recording mode, a playback mode, and so on. Examples of modes included in the still image shooting mode are an auto mode, an auto scene determination mode, a manual mode, various types of scene modes in which shooting settings are configured for each type of scene, a program AE mode, a custom mode, and so on. Any one of these modes can be switched to directly using the mode switching button 103. Alternatively, the mode switching button 103 may be used to switch to a shooting mode selection screen, and the mode may then be switched by using another operation member to select any one of options which are displayed in the shooting mode selection screen and which correspond to the respective shooting modes. Likewise, the moving image recording mode may include a plurality of modes.

The first shutter switch 102a switches on partway through the manipulation of the shutter button 102 provided in the digital camera 100, or in other words, when the button is depressed halfway (a shooting preparation instruction), and produces a first shutter switch signal SW1. Shooting preparation processes, such as an AF process, an AE process, an AWB process, and an EF process, are started in response to the first shutter switch signal SW1.

The second shutter switch 102b turns on when the shutter button 102 is completely manipulated, or in other words, is fully depressed (a shooting instruction), and produces a second shutter switch signal SW2. The system control unit 201 commences a series of shooting processes, from reading out signals from the image capture unit 205 to writing image data into the recording medium 109, in response to the second shutter switch signal SW2.

Functions relevant for different scenes are assigned to the operation members of the operation unit 104, which then act as various types of function buttons, by making an operation for selecting various types of function icons displayed in the display unit 101. An end button, a return button, a next image button, a jump button, a sort button, an attribute change button, and so on are examples of the function buttons. For example, a menu screen in which various types of settings can be made is displayed in the display unit 101 when a menu button is pressed. A user can make various types of settings intuitively using the menu screen displayed in the display unit 101, along with up, down, left, and right four directional buttons, a set button, and so on.

The controller wheel 106 is an operation member, included in the operation units 104, that can be rotationally manipulated, and is used along with the directional buttons when specifying items to be selected and so on. When the controller wheel 106 is turned, an electrical pulse signal is generated in accordance with the amount of rotation, and the system control unit 201 controls each unit of the digital camera 100 based upon the pulse signal. The angle through which the controller wheel 106 has been turned and how many times it has been turned can be determined by the pulse signal. It should be noted that the controller wheel 106 can be any operating member so long as it is an operating member whose rotation can be detected. For example, it can be a dial operating member in which the controller wheel 106 per se is rotated to generate the pulse signal in accordance with a turning operation by the user. Further, it can be a device (a so-called touch wheel) that detects an operation such as the revolution of the user's finger on the controller wheel 106 without by controller wheel 106 itself being rotated.

A power control unit 214 is constituted by a battery detection circuit, a DC-DC converter, switch circuits for switching the blocks through which power elapses, and so on, and detects whether or not a battery is connected, the type of the battery, the remaining battery power, and so on. The power control unit 214 also controls the DC-DC converter based on the detection results and instructions from the system control unit 201, and supplies a necessary voltage for a necessary period to the various units, including the recording medium 109.

A power source unit 215 is a primary battery such as an alkaline battery, a lithium battery, or the like, a secondary battery such as a NiCd battery, a NiMH battery, a lithium-ion battery, or the like, an AC adapter, or the like. A recording medium I/F 216 is an interface for the recording medium 109 such as a memory card, a hard disk, or the like. The recording medium 109 is a recording medium for recording shot images, such as a memory card or the like, and is constituted by a semiconductor memory, a magnetic disk, or the like.

A communication unit 217 communicatively connects to an external device using a wireless antenna, a hard-wire cable, or the like, and exchanges video, audio, and so on. The communication unit 217 can also connect to a wireless LAN (local area network), the Internet, and so on. The communication unit 217 can transmit image data captured by the image capture unit 205 (including live view images), image files recorded into the recording medium 109, and so on to the external device, and can receive image data, various other types of information, and so on from the external device.

An attitude detection unit 218 detects the attitude of the digital camera 100 relative to the gravitational direction. Whether an image captured by the image capture unit 205 was shot with the digital camera 100 held horizontally or shot with the digital camera 100 held vertically can be determined in accordance with the attitude detected by the attitude detection unit 218. The system control unit 201 can add information pertaining to the attitude detected by the attitude detection unit 218 to image data captured by the image capture unit 205, rotate and store the image data on the basis of that information, and so on. An accelerometer, a gyrosensor, or the like can be used as the attitude detection unit.

An eye proximity detection unit 112 detects whether an eye (an object) has approached (eye proximity) or has moved away from (eye non-proximity) the eyepiece part of the viewfinder (proximity detection). The system control unit 201 switches the rear display panel 101*a* and the EVF 101*b* between displaying (a display state)/not displaying (a non-display state) in accordance with the state detected by the eye proximity detection unit 112. For example, the eye proximity detection unit 112 can use an infrared proximity sensor, and can therefore detect some sort of object has approached to the eyepiece part of the viewfinder that includes the EVF 101*b*.

A touch panel 104*a* capable of detecting contact with the rear display panel 101*a* is included as one of the operation units 104. The touch panel 104*a* and the rear display panel 101*a* can be configured as an integrated unit. For example, the touch panel 104*a* is configured having a light transmittance that does not interfere with the display of the rear display panel 101*a*, and is then attached to the top layer of the display surface of the rear display panel 101*a*. Input coordinates of the touch panel 104*a* are then associated with display coordinates of the rear display panel 101*a*. This makes it possible to configure a GUI (graphical user interface) in which the user seems capable of directly manipulating the screen displayed in the rear display panel 101*a*. In other words, a touch sensing surface of the touch panel 104*a* serves as the display surface of the rear display panel 101*a*. An in-cell touch panel display, in which the display element of the rear display panel 101*a* and an electrostatic capacitance-type touch detection (touch sensing) electrode are configured integrally without a separator interposed therebetween, may be used as well. The system control unit 201 can detect the following operations or states with respect to the touch panel 104*a*.

When a finger or pen that had not been touching the touch panel 104*a* newly touches the touch panel 104*a*. In other words, this is the start of a touch (called "touch-down" hereinafter).

When a finger or pen is touching the touch panel 104*a* (called "touch-on" hereinafter).

When a finger or pen is moved while touching the touch panel 104*a* (called "touch-move" hereinafter).

When a finger or pen that had been touching the touch panel 104*a* is released. In other words, this is the end of a touch (called "touch-up" hereinafter).

When nothing is touching the touch panel 104*a* (called "touch-off" hereinafter).

When a touch-down is detected, a touch-on is detected at the same time. A touch-on normally continues to be detected after a touch-down as long as no touch-up is detected. A touch-move being detected is also a state in which a touch-on is detected. Even when a touch-on is detected, a touch-move is not detected as long as the touched position does not move. A touch-off occurs after a touch-up has been detected for all fingers or pens that had been touching.

These operations/states, positional coordinates on the touch panel 104*a* where the finger or pen had been touching, and so on are communicated to the system control unit 201 through an internal bus. The system control unit 201 determines what type of operation (touch operation) has been made on the touch panel 104a on the basis of the communicated information.

With respect to a touch-move, the movement direction of the finger or pen moving on the touch panel 104a can be determined on the basis of changes in the positional coordinates, for each of a vertical component and a horizontal component on the touch panel 104a. Further, it is assumed that a stroke has been carried out when "touch-up" is performed following a regular "touch-move" after a "touch-down" on the touch panel 104a. A very quick stroke operation is called a "flick". A "flick" is an operation in which, with fingers being in contact with the touch panel 104a, the fingers are moved rapidly over a certain distance and then released. In other words, this is a rapid tracing operation in which the fingers are flicked across the surface of the touch panel 104a. A flick can be determined to have been carried out if a touch-move of greater than or equal to a predetermined distance and at greater than or equal to a predetermined speed is detected and a touch-up is then detected. Additionally, a drag is determined to have been carried out if a touch-move of greater than or equal to a predetermined distance and less than a predetermined speed has been detected.

Furthermore, when a plurality of locations (two points, for example) are touched at the same time, and the touched positions are brought together, the touch operation is called a "pinch-in", whereas when the touched positions are moved apart, the touch operation is called a "pinch-out". Pinch-out and pinch-in are collectively referred to as pinch operations (or simply "pinch").

Any of a variety of types of touch panels, such as resistive film, electrostatic capacitance, surface elastic wave, infrared, electromagnetic induction, image recognition, and photodetector, may be used as the touch panel 104a. Depending on the type, a touch is detected when contact is made with the touch panel, or a touch is detected when a finger or pen has approached the touch panel, and either of these types may be used.

The digital camera 100 of the present embodiment is capable of shooting using central single-point AF, face AF, or eye detection AF. Central single-point AF performs AF with respect to one point at a center position in an image capture plane. Face AF performs AF with respect to a face in an image capture plane that is detected by a face detection function. Eye detection AF performs AF with respect to an eye included in a face inside an image capture plane that is detected by an organ (part) detecting function which is a type of a face detection function.

By operating the touch panel 104a, the four directional buttons, and the set button included in the operation units 104, the user can display a live view in an enlarged state, set a focus guide function, perform recording, and make focus adjustment through a manual operation, which will be described later with reference to FIGS. 4A, 4B and 4C. With regard to the enlarged display of the live view, it is possible to perform, via the operation units 104, an instructional operation of switching a display magnification of the live view to one of a plurality of display magnifications including the same size (a first magnification, a normal magnification, a non-enlarged state) and a predetermined enlargement magnification (a second magnification) that represents a greater enlargement than the same size. With regard to the setting of the focus guide function, it is possible to perform, via the operation units 104, an instructional operation of enabling or disabling a function of displaying a focus guide, which will be described later. With regard to the recording, it is possible to perform, via the operation units 104, an instructional operation of starting or ending the recording of moving images. With regard to the focus adjustment through the manual operation, it is possible to perform, via the operation units 104, an instructional operation of adjusting a point of focus through manual focus (an MF operation).

<Display Appearances of Focus Guide>

Next, display appearances of a focus guide according to the present embodiment will be described with reference to FIGS. 3A to 3D.

In the present embodiment, a focus guide (a guide item, a display item) is displayed on a live view based on a defocus amount obtained from an image capture range corresponding to a position at which a focus frame 300, which is included among display elements of the focus guide, is displayed in a superimposed state (inside the frame). More specifically, the focus guide indicates a degree of focus at a focus detection position based on a defocus amount that has been calculated based on output values from a pixel group that is within a range corresponding to the position of the focus frame 300 among pixels which are arranged in the image capture unit 205 and from which a defocus amount can be obtained (pixels in which image capture plane phase-difference detection can be performed). That is to say, the focus guide displays information related to focus with respect to an object at a position that is displayed superimposed on the live view. In the present embodiment, it is assumed that there are four types of display appearance of the focus guide, namely the first to fourth indicator display appearances, and the detected focus state is presented using display parts (display elements) 301 to 311. The display parts 301 to 311 are positioned above the focus frame 300.

FIG. 3A shows one example of the first indicator display appearance, illustrating a state in which the object has been determined to be in focus.

In the state in which the object has been determined to be in the in-focus state, the positions of a display part 301 on the outside and a display part 302 on the inside coincide with each other (here, the display parts have stopped above the focus frame 300). Also, when the object has been determined to be in the in-focus state, for example, the display part 301 and the display part 302 may be displayed in a color (e.g., green) that is different from the color (e.g., white) of other display appearances. The display part 301 is a display part that is presented as one display part generated by combining display parts 307 and 308, which will be described later. The display part 302 is a display part that is presented as one display part generated by combining display parts 304 and 305, which will be described later.

FIGS. 3B and 3C respectively show one example of the second indicator display appearance and one example of the third indicator display appearance, illustrating exemplary display indicating the direction to an in-focus position and the magnitude of a defocus amount when the object is out of focus but the reliability of the result of focus detection is high.

FIG. 3B illustrates exemplary display of a case where a point of focus is closer to the near end than the object (front focus). In this case, in a state in which a display part 303 on the outside (a triangle facing inside) has stopped above the focus frame 300, the display part 304 and the display part 305 on the inside (triangles facing outside) move in a bilaterally symmetrical manner along a circumference surrounding the focus frame 300 along with a change in the defocus amount. The positions of the display part 304 and the display part 305 indicate the magnitude of the defocus amount, and the larger the distance between these parts and the position of the display part 303 (a reference position), the larger the defocus amount. It should be noted that the display part 303 corresponds to the display part 301, and a state in which the display part 304 and the display part 305 overlap corresponds to the display part 302.

FIG. 3C illustrates exemplary display of a case where a point of focus is closer to the far end than the object (rear focus). In this case, in a state in which a display part 306 on the inside (a triangle facing outside) has stopped above the focus frame 300, the display part 307 and the display part 308 on the outside (triangles facing inside) move in a bilaterally symmetrical manner along a circumference surrounding the focus frame 300 along with a change in the defocus amount. The positions of the display part 307 and the display part 308 indicate the magnitude of the defocus amount, and the larger the distance between these parts and the position of the display part 306 (a reference position), the larger the defocus amount. It should be noted that the display part 306 corresponds to the display part 302, and a state in which the display part 307 and the display part 308 overlap corresponds to the display part 301.

As described above, the second indicator display appearance and the third indicator display appearance can indicate the magnitude of the defocus amount using the positions of the movable display parts. They can also indicate the direction to the in-focus position (a defocus direction) using the direction of the display part that has stopped above the focus frame 300.

FIG. 3D is a diagram showing one example of the fourth indicator display appearance, illustrating exemplary display of a case where the reliability of the result of focus detection is low. In this case, neither the magnitude of the defocus amount nor the defocus direction is presented so that the user visually acknowledges that focus detection cannot be performed. The present embodiment uses a display appearance in which each of display parts 309 to 311 is displayed in a color (e.g., gray) that is different from that of other display appearances, and each of the display parts 309 to 311 is fixed at a predetermined position. In addition, the shape of each of the display parts 309 to 311 is different from that of other display appearances.

Although the display appearances of the focus guide according to the present embodiment have been described using FIGS. 3A to 3D, no limitation is intended by this. Furthermore, although the focus guide displays a degree of focus based on a defocus amount based on a signal obtained from the image capture unit 205 (an image capture plane phase-difference signal) in the foregoing description, no limitation is intended by this. The degree of focus may be indicated based on an output value from a focus detection sensor (e.g., a phase-difference sensor) that is set at a position different from the image capture plane, or the degree of focus may be indicated based on a contrast value.

<Shooting Processes>

Next, with reference to FIGS. 4A, 4B, 4C and 5A to 5J, a shooting mode of the digital camera 100 of the present embodiment will be described.

Figure 4A:
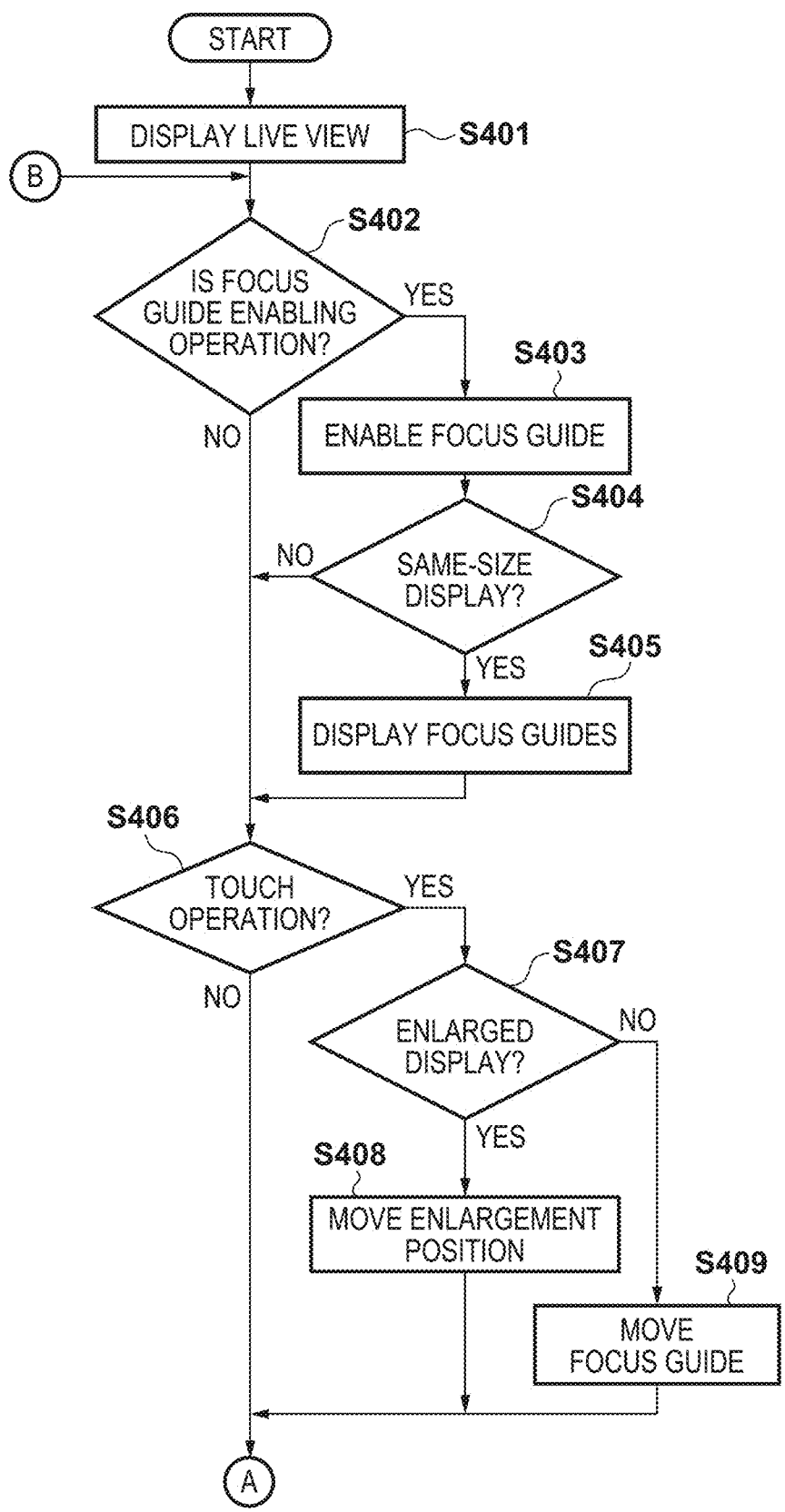
FIGS. 4A, 4B and 4C are flowcharts illustrating shooting mode processing.
Figure 4B:
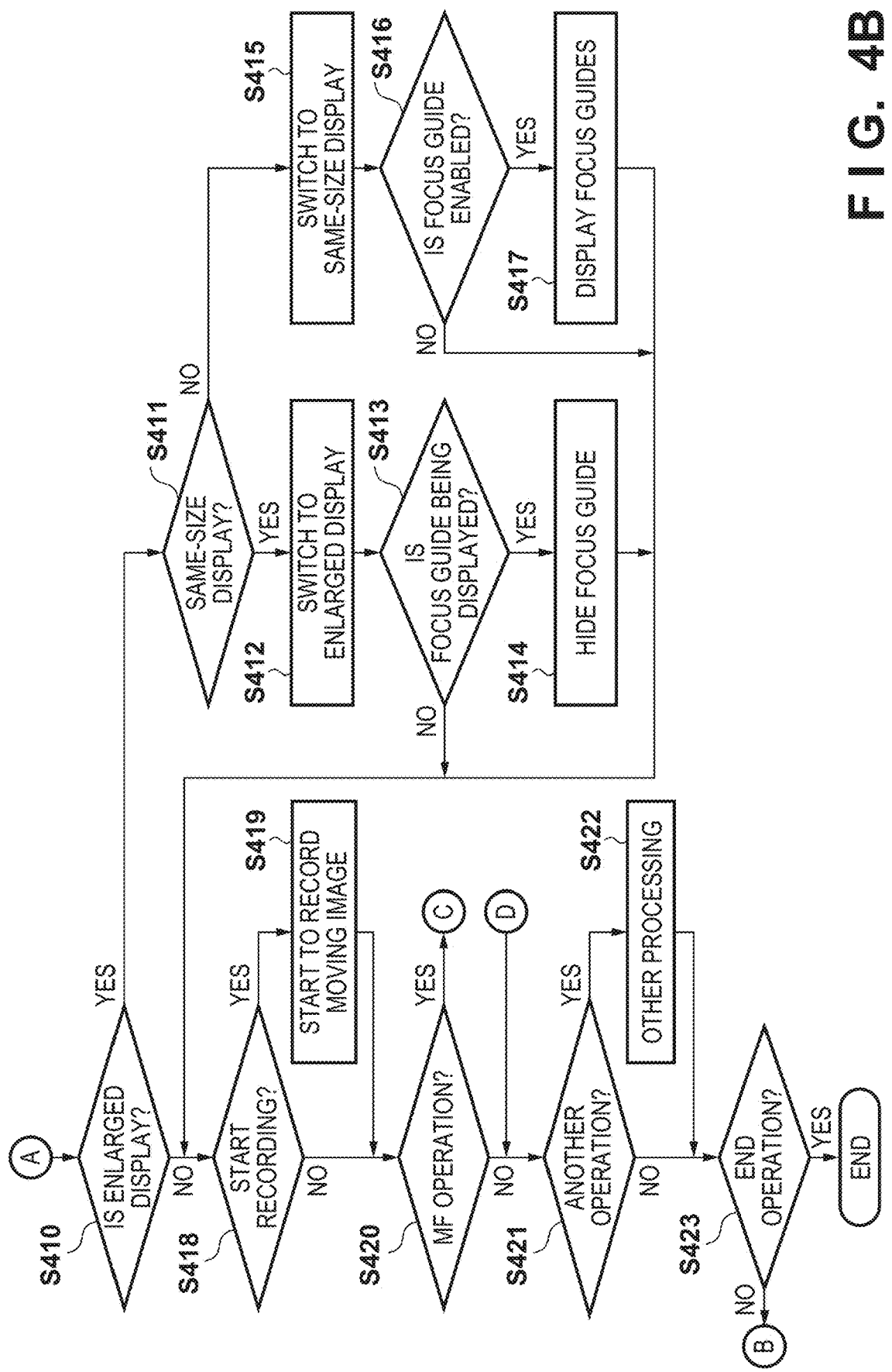
Figure 4C:
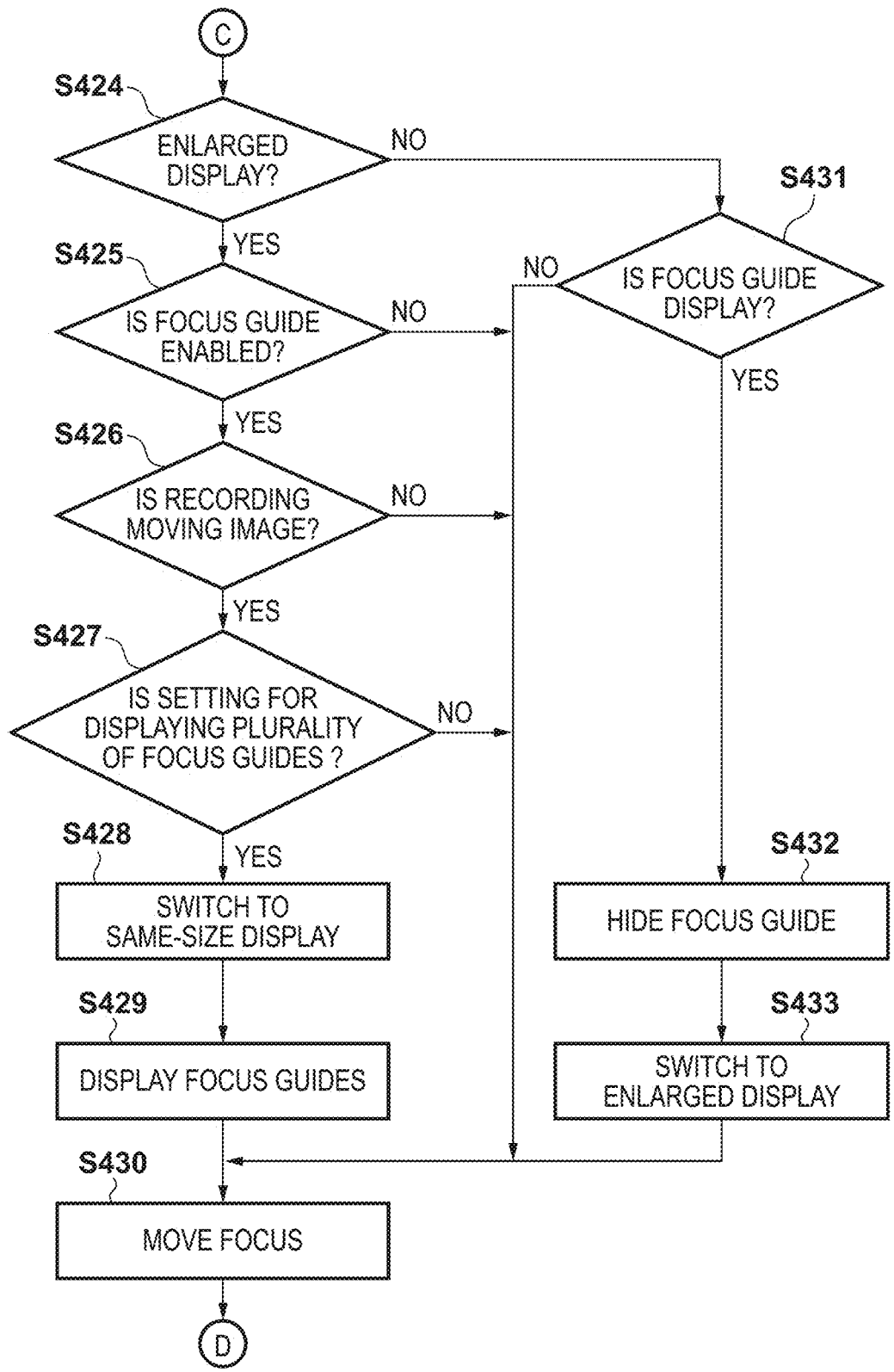

It should be noted that processing of FIGS. 4A, 4B and 4C is realized as programs recorded in the non-volatile memory 213 are read out into the system memory 212 and executed by the system control unit 201. When the digital camera 100 is activated in a shooting mode, shooting mode processing of FIGS. 4A, 4B and 4C is started.

In step S401, the system control unit 201 starts image capturing processes using the image capture unit 205, and displays a live view on the display unit 101. The system control unit 201 also reads out camera setting values from the non-volatile memory 213, and displays information icons indicating the camera setting values on the display unit 101 in such a manner that the information icons are superimposed on the live view.

Figure 5A:
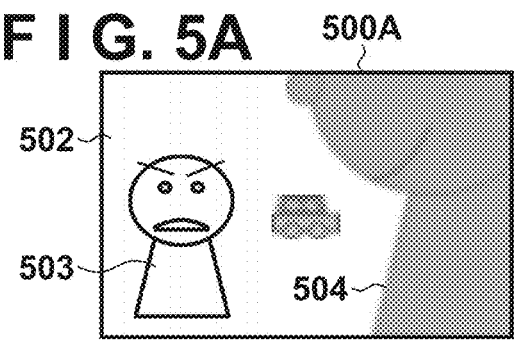
FIGS. 5A to 5J illustrate examples of live view display screens.

FIG. 5A shows an exemplary screen during live view display. A screen 500A of FIG. 5A displays a live view 502, and an object (DETECTIVE) 503 and an object (CRIMINAL) 504 are included in the live view 502.

In step S402, the system control unit 201 determines whether an operation of enabling a focus guide function has been performed via the operation units 104; if it is determined that the operation has been performed, the process proceeds to step S403, and otherwise the process proceeds to step S406.

In step S403, the system control unit 201 enables the focus guide function.

In step S404, the system control unit 201 determines whether the live view is currently displayed at the same size; if it is determined that the live view is displayed at the same size, the process proceeds to step S406, and otherwise the process proceeds to step S405.

Figure 5B:
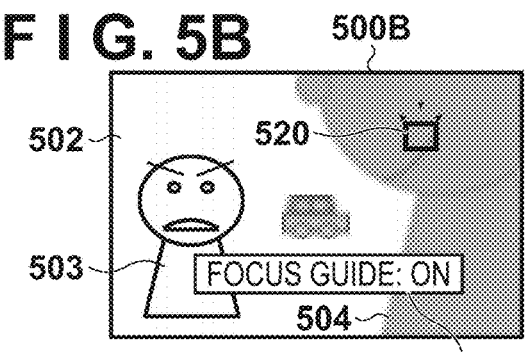
Figure 5C:
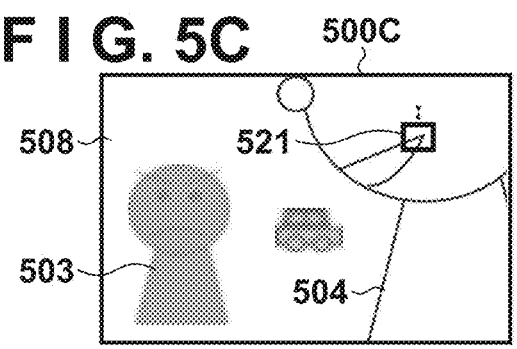
Figure 5D:
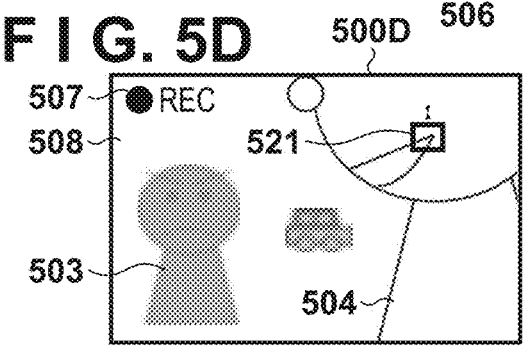
Figure 5E:
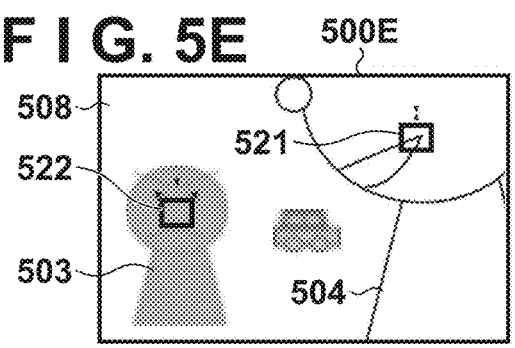

In step S405, the system control unit 201 displays, on the display unit 101, a focus guide superimposed on the live view. FIG. 5B shows an exemplary screen for which the focus guide function has been enabled and which displays the focus guide superimposed on the live view. On a screen 500B of FIG. 5B, a focus guide 520 is displayed superimposed on the object 504 in the live view 502, and guidance 506 indicating that the focus guide function has been enabled is displayed for a predetermined time period. A display appearance of the focus guide 520 changes in accordance with the result of focus detection at a focus guide position, as has been described with reference to FIGS. 3A to 3D. The focus guide 520 of FIG. 5B indicates an out-of-focus state, and a focus guide 521 on a screen 500C of FIG. 5C indicates an in-focus state. It should be noted that a plurality of focus guides may be displayable (settable). FIG. 5E shows an exemplary screen on which a plurality of focus guides are displayed (set) in live view display of the same size. On a screen 500E of FIG. 5E, a plurality of focus guides 521, 522 are simultaneously displayed with respect to a plurality of objects 503, 504.

In step S406, the system control unit 201 determines whether a touch operation, such as a touch-down and a touch-move, has been performed with respect to the touch panel 104a included in the operation units 104; if it is determined that the touch operation has been performed, the process proceeds to step S407, and otherwise the process proceeds to step S410.

In step S407, the system control unit 201 determines whether the live view is currently displayed in an enlarged state; if it is determined that the live view is displayed in the enlarged state, the process proceeds to step S408, and otherwise the process proceeds to step S409.

In step S408, the system control unit 201 moves a central position of the enlarged display of the live view in accordance with a position at which the touch operation was performed or a moving amount.

In step S409, the system control unit 201 moves a display position of the focus guide in accordance with a position at which the touch operation was performed or a moving amount. Note that the display of the enlarged position and the display of the focus guide may be brought into coordination with each other.

In step S410, the system control unit 201 determines whether an instruction for enlarged display of the live view has been made via the operation units 104; if it is determined that the instruction has been made, the process proceeds to step S411, and otherwise the process proceeds to step S418.

In step S411, the system control unit 201 determines whether the live view is currently displayed at the same size; if it is determined that the live view is displayed at the same size, the process proceeds to step S412, and otherwise the process proceeds to step S415.

Figure 5F:
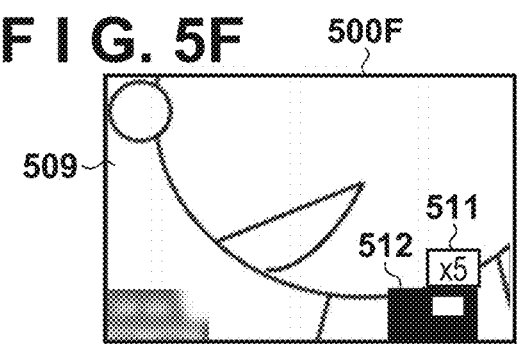

In step S412, the system control unit 201 switches the live view that is displayed at the same size on the display unit 101 to enlarged display. FIG. 5F shows an exemplary screen at the time of the enlarged display of the live view. On a screen 500F of FIG. 5F, an enlargement magnification 511, an indicator 512 indicating the enlarged position, and the like are displayed superimposed on a live view 509 that is displayed in an enlarged state.

In step S413, the system control unit 201 determines whether the focus guide is currently displayed; if it is determined that the focus guide is displayed, the process proceeds to step S414, and otherwise the process proceeds to step S418.

In step S414, the system control unit 201 keeps the focus guide, which was displayed on the display unit 101, from being displayed. As in the screen 500F of FIG. 5F, the focus guide is not displayed on the live view 509 that is displayed in the enlarged state.

In step S415, the system control unit 201 switches the live view that is displayed in the enlarged state on the display unit 101 to the same-size display.

In step S416, the system control unit 201 determines whether the focus guide function is enabled; if it is determined that the focus guide function is enabled, the process proceeds to step S417, and otherwise the process proceeds to step S418.

In step S417, the system control unit 201 displays the focus guide superimposed on the live view that is displayed at the same size on the display unit 101. On the screen 500C of FIG. 5C and the screen 500E of FIG. 5E, the focus guides 521, 522 are displayed superimposed on a live view 508 that is displayed at the same size.

In step S418, the system control unit 201 determines whether an instruction for starting recording has been made via the operation units 104; if it is determined that the instruction has been made, the process proceeds to step S419, and otherwise the process proceeds to step S420.

In step S419, the system control unit 201 starts recording moving images. FIG. 5D shows an exemplary screen during the recording of the moving images. On a screen 500D of FIG. 5D, an ongoing recording icon 507 indicating that the moving images are currently recorded is displayed superimposed on the live view 508. Furthermore, even during the recording of the moving images, the focus guide 521 or 520 is displayed as long as the focus guide function is enabled.

In step S420, the system control unit 201 determines whether the MF operation has been performed via the operation units 104; if it is determined that the MF operation has been performed, the process proceeds to step S424, and otherwise the process proceeds to step S421.

In step S421, the system control unit 201 determines whether another operation has been performed via the operation units 104; if it is determined that another operation has been performed, the process proceeds to step S422, and otherwise the process proceeds to step S423. Examples of another operation include a shooting parameter setting operation, a still image shooting operation, and the like other than the MF operation.

In step S422, the system control unit 201 performs process corresponding to another operation.

In step S423, the system control unit 201 determines whether an operation of ending the shooting mode processing has been performed via the operation units 104; if it is determined that the ending operation has been performed, the process ends, and otherwise the process proceeds to step S402.

In step S424, the system control unit 201 determines whether the live view is currently displayed in an enlarged state; if it is determined that the live view is currently displayed in the enlarged state, the process proceeds to step S425, and otherwise the process proceeds to step S431.

In step S425, the system control unit 201 determines whether the focus guide function is enabled; if it is determined that the focus guide function is enabled, the process proceeds to step S426, and otherwise the process proceeds to step S430.

In step S426, the system control unit 201 determines whether moving images are being recorded; if it is determined that the moving images are currently recorded, the process proceeds to step S427, and otherwise the process proceeds to step S430. Here, whether the moving images are currently recorded is determined for the following reason: the case where focus adjustment is intended to be made in the middle of the same-size display occurs mainly during the recording of the moving images, and it is thought that, for example, the way in which focus moves through the NIF operation is intended to be recorded.

In step S427, the system control unit 201 determines whether a plurality of focus guides are displayed; if it is determined that the plurality of focus guides are displayed, the process proceeds to step S428, and otherwise the process proceeds to step S430.

In step S428, the system control unit 201 switches the live view that is displayed in the enlarged state on the display unit 101 to the same-size display.

In step S429, the system control unit 201 displays the focus guides superimposed on the live view that is displayed at the same size on the display unit 101. On the screen 500C of FIG. 5C and the screen 500E of FIG. 5E, the focus guides 521, 522 are displayed superimposed on the live view 508 that is displayed at the same size.

In step S430, the system control unit 201 moves the photographing lens 203 in accordance with a focus adjustment amount of the NIF operation performed in step S420.

In step S431, the system control unit 201 determines whether a focus guide is displayed superimposed on the live view; if it is determined that the focus guide is displayed in the superimposed state, the process proceeds to step S432, and otherwise the process proceeds to step S430.

In step S432, the system control unit 201 hides the focus guide, which has been displayed superimposed on the live view, from being displayed.

In step S433, the system control unit 201 switches the live view that is displayed at the same size on the display unit 101 to enlarged display.

Figure 5G:
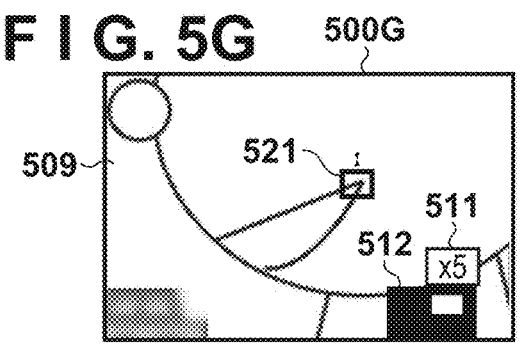
Figure 5H:
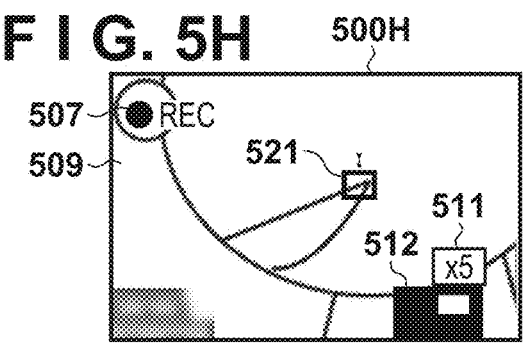

Although a focus guide is not displayed during the enlarged display of the live view in the present embodiment, the display of the focus guide may be continued and moving images may be recordable also during the enlarged display, as indicated by an exemplary screen of FIG. 5G. On a screen 500G of FIG. 5G, the focus guide 521 is displayed superimposed on the live view 509 that is displayed in the enlarged state. FIG. 5H shows an exemplary screen for a case where recording of moving images have been started in the state of FIG. 5G. On a screen 500H of FIG. 5H, the ongoing recording icon 507 indicating that the moving images are currently recorded is displayed superimposed on the live view 509 that is displayed in the enlarged state.

Figure 5I:
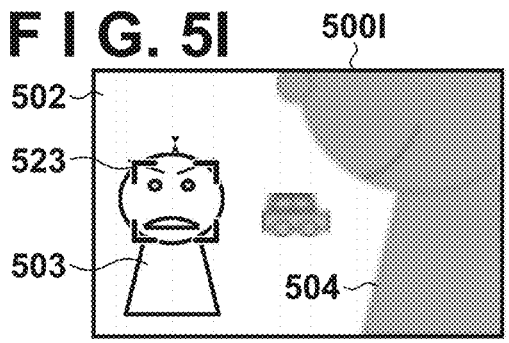
Figure 5J:
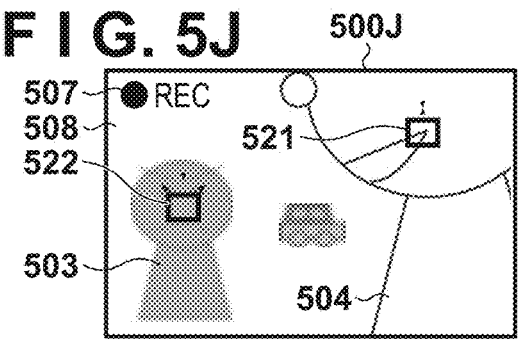

Furthermore, although a focus guide is displayed in the form of a quadrilateral frame having a certain size in the examples of FIGS. 5A to 5H, the focus guide may be displayed in such a manner that its size is variable in accordance with the result of object detection. FIG. 5I shows an exemplary screen that displays a focus guide on a face detection frame. On a screen 500I of FIG. 5I, a focus guide 523 of the face detection frame is displayed superimposed on the object 503. It should be noted that, as indicated by an exemplary screen of FIG. 5J, moving images may be recordable while displaying a plurality of focus guides. On a screen 500J of FIG. 5J, the focus guides 521, 522 are displayed respectively on the objects 504, 503, and the ongoing recording icon 507 indicating that the moving images are currently recorded is displayed superimposed on the live view 508.

Furthermore, in a case where an eye detection function that is capable of detecting an eye as an organ on a face has been enabled, when enlarged display is performed based on a eye position on which a focus guide is placed, the same-size display may not be switched to even when the MF operation is performed. This is because a user who is displaying the eye position on which the focus guide is placed in the enlarged state is thought to have an intension to check a degree of focus at the eye position in detail. Meanwhile, when enlarged display is performed based on a face position on which a focus guide is placed, such as when an eye has not been detected or when the eye detection function is disabled, the same-size display may be switched to in response to the MF operation. This is because a user who is displaying the face position on which the focus guide is placed in the enlarged state is thought to have an intension to check, for example, an overall facial expression.

It should be noted that the determinations of whether to switch from the enlarged display of the live view to the same-size display in the above-described steps S425 to S427 may not be carried out in their entirety. In addition, when the digital camera can switch between an autofocus mode and a manual focus mode, processing for switching from the enlarged display to the same-size display (hereinafter, display switching processing) may be performed in response to the MF operation only in the case of the manual focus mode. That is to say, when the autofocus mode is set, the enlarged display may be maintained even when the MF operation is performed. Moreover, the aforementioned display switching processing may be performed only when an output destination of the live view is the EVF 101b (when nothing is displayed on the rear display panel 101a). This is because when the output destination is the rear display panel 101a and nothing is displayed on the EVF 101b, a user can make focus adjustment while checking the conditions of the surroundings of an object.

Furthermore, although whether the focus guide function is enabled is determined during the enlarged display in step S425, this determination may be made before the enlarged display. In this case, as a user who has enabled the focus guide function before the enlarged display is thought to have an intension to use the focus guide since before the enlarged display, it is sufficient to switch to the same-size display after performing the enlarged display and making focus adjustment, and display the focus guide also during the same-size display. In addition, as a user who has enabled the focus guide function during the enlarged display is thought to have an intension to make focus adjustment while viewing the focus guide during the enlarged display, the same-size display may be switched to after making focus adjustment, and the focus guide may be displayed also during the same-size display. When a setting is configured so as not to display the focus guide, the enlarged state is maintained without switching to the same size even when a focus adjustment operation is performed during the enlarged state. Moreover, when the position of the focus guide has been adjusted through a touch operation in either a state before the enlarged display or a state after the enlarged display, the same-size display may be switched to in response to focus adjustment; when the position of the focus guide has not been adjusted during the enlarged state while a setting is configured so as to display (enable) the focus guide, the enlarged state may be maintained without switching to the same size even when a focus adjustment operation is performed during the enlarged state. This is because a user who is adjusting the position of the focus guide is thought to be a user who has an intension to make focus adjustment while viewing the focus guide.

Furthermore, even when moving images are not currently recorded in step S426, and when one or no focus guide is displayed (the focus guide is not enabled) in step S427, the aforementioned display switching processing (processing for switching to the same size in response to a focus adjustment operation during the enlarged state and displaying the focus guide) may be performed. In addition, whether to perform the aforementioned display switching processing may be settable ahead of time in a selective manner on a menu screen or the like. When such a setting is configured, the display switching processing is performed in response to the MF operation; when such a setting is not configured, the enlargement magnification is maintained without switching to the same-size display even when the MF operation is performed.

Furthermore, in place of the determination of step S431, or as an additional determination for a case where the determination of step S431 has led to the YES branch, it is possible to determine if whether to perform the enlarged display in response to the MF operation has been set ahead of time in a selective manner on a menu screen or the like. In this case, when a setting is configured so as to perform the enlarged display in response to the MF operation, the process proceeds to steps S432, S433, and the enlarged display is switched to in response to the MF operation. When the enlarged display is currently performed, the enlarged display is maintained without switching to the same-size display even when another MF operation is further performed thereafter. That is to say, after it is determined that the enlarged display is currently performed in step S424, whether a setting is configured so as to perform the enlarged display in response to the MF operation is determined, and if a setting is configured so as to perform the enlarged display in response to the MF operation, the process proceeds to step S430 without proceeding to step S425. On the other hand, in a case where the determination of step S424 has led to the NO branch, if it is determined that a setting is configured so as not to perform the enlarged display in response to the MF operation, the process does not proceed to steps S432, S433, and the enlarged display is not performed.

Note that the above-described various types of control performed by the system control unit 201 may be carried out by a single piece of hardware, or the control of the apparatus as a whole may be carried out by dividing the processing up among multiple pieces of hardware (for example, multiple processors, circuits or modules).

Although the foregoing has described a preferred embodiment of the present invention, the present invention is not intended to be limited to the specific embodiment, and all variations that do not depart from the essential spirit of the invention are intended to be included in the scope of the present invention. Furthermore, the above-described embodiment is merely one embodiment of the present invention, and different embodiments can be combined as appropriate.

In addition, in the above embodiments, a case has been described as an example, in which the present invention is applied to the digital camera, but the present invention is not limited to this example, and can be applied to any apparatus that has a function to perform enlarged display of the live view and a function to display a focus guide so as to be superposed on the live view. Accordingly, the present invention can be applied in personal computers and PDAs, mobile telephone terminals and portable image viewers, digital photo frames, music players, game devices, e-book readers, tablet terminals, smartphones, and the like. The present invention can also be applied in projection apparatuses, as well as household apparatuses, vehicle-mounted apparatuses, medical devices, and so on including displays.

The present invention is not limited to a camera body, and can also be applied in a control apparatus that communicates with an image capturing apparatus (including a network camera) through wired or wireless communication and remotely controls the image capturing apparatus. Apparatuses such as a smartphone, which is a type of mobile phone, a tablet PC, a desktop PC, and the like can be given as examples of control apparatuses that remotely control an image capturing apparatus. The image capturing apparatus can be controlled remotely by the control apparatus communicating commands for carrying out various types of operations, settings to the image capturing apparatus, and the like on the basis of operations made in the control apparatus, processes carried out by the control apparatus, and the like. Additionally, a live view image shot by the image capturing apparatus may be received by the control apparatus through wired or wireless communication and displayed.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-172826, filed Sep. 14, 2018 which is hereby incorporated by reference herein in its entirety.

What is claimed is:

1. An image capture control apparatus comprising:
an operation member configured to accept an MF operation that is an instructional operation for manual focus; and
a memory and at least one processor and/or at least one circuit which function as
a switching unit configured to switch a display magnification of a live view to one of a plurality of display magnifications including a first magnification and a second magnification that represents a greater enlargement than the first magnification,
a display control unit configured to perform control to display a guide indicating a degree of focus at a focus detection position, and
a control unit configured to perform control to, when the live view is displayed at the second magnification, switch the live view to display at the first magnification and display the guide together with the live view at the first magnification if the MF operation is performed.

2. The apparatus according to claim 1, wherein
the control unit performs control to, when the live view is displayed at the second magnification, switch the live view to display at the first magnification, display the guide together with the live view at the first magnification, and make focus adjustment in accordance with the MF operation if the MF operation is performed.

3. The apparatus according to claim 1,
wherein
the memory and the processor and/or the circuit further function as a setting unit configured to be capable of enabling or disabling a function of displaying the guide, and
when the function is enabled while the live view is displayed at the second magnification, the control unit performs control to switch the live view to display at the first magnification if the MF operation is performed, and when the function is disabled while the live view is displayed at the second magnification, the control unit maintains display in the second magnification even if the MF operation is performed.

4. The apparatus according to claim 1, wherein
when the live view is displayed at the second magnification while moving images are recorded, the control unit performs control to switch the live view to display at the first magnification if the MF operation is performed, and while the moving images are not recorded, the control unit maintains display at the second magnification even if the MF operation is performed when the live view is displayed at the second magnification.

5. The apparatus according to claim 1, wherein
when more than one of the guide is set and the live view is displayed at the second magnification, the control unit performs control to switch the live view to display at the first magnification if the MF operation is performed, and when more than one of the guide is not set and the live view is displayed at the second magnification, the control unit maintains display at the second magnification even if the MF operation is performed.

6. The apparatus according to claim 1, wherein
when a setting is configured so as to perform enlarged display in response to the MF operation while the live view is displayed at the first magnification, the control unit switches the live view to display at the second magnification in response to the MF operation, and thereafter maintains display of the live view at the second magnification even if the MF operation is performed.

7. The apparatus according to claim 1, wherein
the control unit does not display the guide when the live view is displayed at the second magnification.

8. The apparatus according to claim 1,
wherein
the memory and the processor and/or the circuit further function as a mode setting unit configured to be capable of setting a manual focus mode or an autofocus mode,
when the manual focus mode is set and the live view is displayed at the second magnification, the control unit performs control to switch the live view to display at the first magnification if the MF operation is performed, and
when the autofocus mode is set and the live view is displayed at the second magnification, the control unit maintains display at the second magnification even if the MF operation is performed.

9. The apparatus according to claim 1, further comprising a first display within a viewfinder, and a second display outside the viewfinder,
wherein
when the live view is displayed at the second magnification on the first display and the live view is not displayed on the second display, the control unit performs control to switch the live view on the first display to display at the first magnification if the MF operation is performed, and
when the live view is not displayed on the first display and the live view is displayed at the second magnification on the second display, the control unit maintains display of the live view at the second magnification on the second display even if the MF operation is performed.

10. The apparatus according to claim 1,
wherein
the memory and the processor and/or the circuit further function as a detection unit configured to be capable of detecting a face and an eye that is an organ of the face from a live view image, and
while the live view is displayed at the second magnification, when enlarged display of the live view is performed based on a position of the eye, the control unit performs control so as not to switch the live view to display at the first magnification even if the MF operation is performed, and when enlarged display of the live view is performed based on a second position that is different from the position of the eye, the control unit performs control to switch the live view to display at the first magnification if the MF operation is performed.

11. A method of controlling an image capture control apparatus having an operation member configured to accept an MF operation that is an instructional operation for manual focus, the method comprising:
switching a display magnification of a live view to one of a plurality of display magnifications including a first magnification and a second magnification that represents a greater enlargement than the first magnification;
performing control to display a guide indicating a degree of focus at a focus detection position; and
performing control to, when the live view is displayed at the second magnification, switch the live view to display at the first magnification and display the guide together with the live view at the first magnification if the MF operation is performed.

12. A non-transitory computer-readable storage medium storing a program that causes a computer to function as a switching unit, a display control unit and a control unit of an image capture control apparatus comprising an operation member configured to accept an MF operation that is an instructional operation for manual focus, wherein
the switching unit is configured to switch a display magnification of a live view to one of a plurality of display magnifications including a first magnification and a second magnification that represents a greater enlargement than the first magnification,
the display control unit is configured to perform control to display a guide indicating a degree of focus at a focus detection position, and
the control unit is configured to perform control to, when the live view is displayed at the second magnification, switch the live view to display at the first magnification and display the guide together with the live view at the first magnification if the MF operation is performed.

* * * * *